United States Patent
Angeletakis

(10) Patent No.: US 8,318,886 B2
(45) Date of Patent: Nov. 27, 2012

(54) VINYL FUNCTIONALIZED ALKOXY-SILOXYLATED POLYETHERS AND POLYESTERS

(76) Inventor: Christos Angeletakis, Orange, CA (US)

( * ) Notice: Subject to any disclaimer, the term of this patent is extended or adjusted under 35 U.S.C. 154(b) by 197 days.

(21) Appl. No.: 12/806,865

(22) Filed: Aug. 23, 2010

(65) Prior Publication Data

US 2011/0054138 A1   Mar. 3, 2011

Related U.S. Application Data

(60) Provisional application No. 61/275,087, filed on Aug. 25, 2009.

(51) Int. Cl.
*C08G 77/46* (2006.01)

(52) U.S. Cl. .......................................... 528/29; 528/31

(58) Field of Classification Search .................... 528/29, 528/31
See application file for complete search history.

(56) References Cited

U.S. PATENT DOCUMENTS

2007/0100153 A1* 5/2007 Brueckner et al. ............ 556/470
* cited by examiner

*Primary Examiner* — Kuo-Liang Peng

(57) ABSTRACT

A method is described herein for the preparation of a resin that may be used as a component in formulations of hydrosilation cured vinyl disiloxanes to increase the hydrophilicity and thereby reduce the contact angle. The resin is a vinyl functionalized alkoxy-siloxylated polyether or polyester copolymer and the method involves reacting a hydride functionalized siloxane in the presence of a Lewis acid catalyst with (a) one or more of an alcohol, a polyether diol, a polyether polyol, a polyester diol or polyester polyol and (b) a hydride functionalized siloxane containing a terminal vinyl group directly bonded to a silicon atom. This resin can be used in the formulation of dental impression materials.

4 Claims, No Drawings

VINYL FUNCTIONALIZED ALKOXY-SILOXYLATED POLYETHERS AND POLYESTERS

CROSS REFERENCE TO RELATED APPLICATIONS

This application claims the benefit of and priority to prior filed Provisional Application Ser. No. 61/275,087 filed Aug. 25, 2009 which is expressly incorporated herein by reference.

FIELD OF THE INVENTION

This invention relates to a process for making vinyl functionalized alkoxy-siloxylated (or alkoxy-siloxane) polyether or polyester (alkoxy-SPE) copolymers that are capable of being polymerized by a hydrosilation reaction.

BACKGROUND OF THE INVENTION

One category of copolymers having good flexibility is the siloxane polyether (SPE) copolymers. These SPE copolymers are generally considered as nonionic "surface active" agents and one of their uses is for the preparation of various types of emulsions. There are many commercially available SPE copolymers. These block copolymers are of two types. One SPE copolymer type is prepared by the platinum complex catalyzed hydrosilation reaction of hydride functionalized polydimethylsiloxanes with alkenes. The hydrosilation prepared SPE copolymers contain Si—C—C linkages and can be named alkyl-SPE. There are several commercially available alkyl-SPE copolymers, such as Dow Corning 2-8692 fluid or the Silwet series from GE Silicones. There are many diverse uses for these copolymers, such as nonionic surfactants and defoamers. However the preparation method used for alkyl-SPE, namely hydrosilation, suffers from the disadvantage that it never goes to completion, always resulting in the starting materials being present in the final product, especially the alkene reactant in non-negligible amounts, e.g., at 10% or higher, and other unsaturated impurities such as enol ethers. These impurities are difficult to remove by distillation due to high boiling point. The presence of allyl ethers in the SPE does not generally interfere with many commercial uses of these products, such as for surfactants. However when these SPE copolymers are further functionalized with vinyl groups and included in 2 part addition silicone impression material formulations, these impurities cause slowing of the hydrosilation reaction. Use of such copolymers requires a higher concentration of platinum catalyst to get sufficient physical properties and it is likely they cannot be included in the catalyst side due to compromised shelf life. Despite these limitations, several polymerizable SPE are described in the patent literature for use in addition silicone impression materials used in dentistry, apparently all of them obtained via a hydrosilation reaction. These are Stepp U.S. Pat. No. 5,580,921 (Wacker), Kamokora U.S. Pat. No. 6,861,457 (GC Corp) and Bublewitz US2008319100A1 (Kettenbach) and other related publications. There is therefore a need for a preparation method for an SPE without unsaturated impurities being present in the final product.

Another SPE copolymer type is prepared by a condensation reaction, that is, by the coupling of a chlorine or acetoxy substituted polydimethylsiloxane (PDMS) with an alcohol to afford alkoxy substituted PDMS, but this method suffers from the difficulty of removing the hydrochloric acid or other acid waste and is relatively expensive to scale to large amounts.

The condensation prepared SPE copolymers contain Si—O—C linkages and can be named alkoxy-SPE. The alkyl-SPE copolymers are more hydrolytically stable than the alkoxy-SPE in strongly acid conditions. However in neutral or weakly acid or basic conditions (such as physiologic pH) their hydrolysis rates are comparable.

The dehydrogenative sylilation of hydride functionalized siloxanes and alcohols is a known synthetic route to highly pure alkoxy functionalized siloxanes (see, e.g., PMSE 2005, 92, 365; PMSE 2004, 91, 587). This dehydrogenation is carried out in the presence of a very strong Lewis acid catalyst, such as tris(pentafluoro-triphenyl)borane, $B(C_6F_5)_3$. This preparatory route is convenient since the byproduct, hydrogen gas, is easy to remove as opposed to the chlorosiloxane route that gives difficult to dispose of hydrochloric acid.

The dehydrogenation of hydride-functionalized polyorganosiloxanes with alcohols has been described in U.S. Patent Application Publication No. US 2004/0186260 ('6260 publication) submitted by Goldschmidt AG. The process disclosed therein is for preparing alkoxy-substituted polyorganosiloxanes using the dehydrogenation reaction in the presence of a main group III and/or transition group III catalyst and optionally a solvent. Specifically, the '6260 publication contains examples relating to the reaction of hydride terminated (alpha, omega disubstituted and/or tethered (comb-like)) polyorganosiloxanes with simple alcohols and simple alcohol started polyethers. However, the '6260 publication does not disclose any specific copolymers or method of making same that provide the desired results in an addition silicone based dental impression material.

In dentistry, addition silicones are the most widely used impression materials. Addition silicones cure with a hydrosilation mechanism and contain a platinum compound as a catalyst. Despite the addition of various surfactants, the hydrophilicity of the materials as measured by contact angle measurements, especially before set is completed, is very low. This reduces the ability of the impression material to displace oral fluids during curing and results in a compromised impression. Moreover, increased use of non-ionic surfactants leads to extraction into oral fluids producing an undesirable taste. Since these non-ionic surfactants are non-polymerizable, increased amounts used can also lead to weakening of the elastomer upon curing. Another class of impression material, the polyethers, as exemplified by IMPREGUM® (from 3M ESPE) are 2-part systems containing imine terminated polyether copolymers cured by reaction with a strong acid. However, these polyethers suffer from high rigidity, which is a property of crosslinked polyethers, and poor taste and smell due to the presence of imines and strong acids.

There is thus a need for a vinyl functionalized alkoxy-SPE copolymer with properties that can be used as a resin component together with a vinyl functionalized siloxane, both curable via a hydrosilation reaction for use in a dental impression material, and a process of making the same.

SUMMARY OF THE INVENTION

The invention provides a method for the preparation of a resin that may be used as a component in formulations of hydrosilation cured vinyl disiloxanes to increase the hydrophilicity and thereby reduce the contact angle. The resin is a vinyl functionalized alkoxy-siloxylated polyether or polyester copolymer and the method involves reacting a hydride functionalized siloxane in the presence of a Lewis acid catalyst with (a) one or more of an alcohol, a polyether diol, a polyether polyol, a polyester diol or polyester polyol and (b) a hydride functionalized siloxane containing a terminal vinyl group directly bonded to a silicon atom. This resin can be used in the formulation of dental impression materials.

DETAILED DESCRIPTION

The present invention provides a resin comprising an alkoxy-siloxane polyether (alkoxy-SPE) backbone functionalized with at least two vinyl groups capable of undergoing a hydrosilation reaction. The vinyl groups may be pendant, terminal or cyclic groups. By "terminal," it is meant that the backbone is terminated at the ends with functional groups. These "terminal groups" may also be referred to herein as "end groups" or "endcappers" and the corresponding linear copolymer may be referred to as "terminated". By "pendant" it is meant that the vinyl groups are pendant or tethered to the backbone. By cyclic it is meant that the vinyl groups are substituted on a cyclic dimethyl siloxane fragment that is pendant or terminal substituted on the alkoxy-SPE backbone.

Linear Terminated Vinyl SPE

The linear vinyl terminated alkoxy-SPE copolymers are prepared using the dehydrogenation process by initially reacting a terminal hydride polydimethyldisiloxane (HP-DMS) with a diol using a Lewis acid catalyst and then terminating by adding a hydride functionalized vinyl siloxane such as vinyltetramethyldisiloxane (VTMDS). This process is shown in Scheme 1.

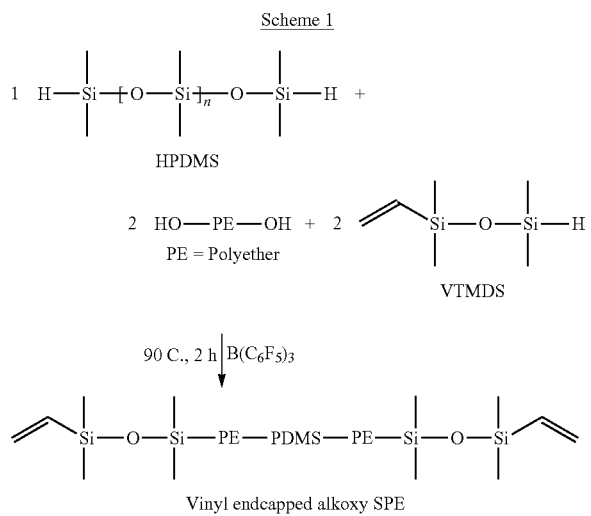

In accordance with the present invention, the linear vinyl endcapped alkoxy-SPE have the general Structure (1):

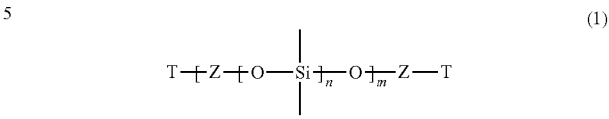

wherein:

Z is a polyoxyalkylene group composed of ethylene oxide units, propylene oxide units, butylene oxide units or higher alkylene units and combinations thereof as shown in the following Formula (2):

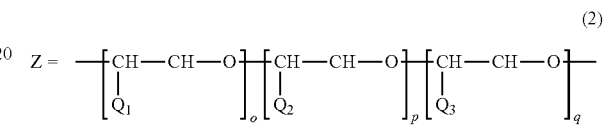

And T is an organic fragment containing a terminal vinyl group directly bonded to a silicon atom as shown in Formula 3:

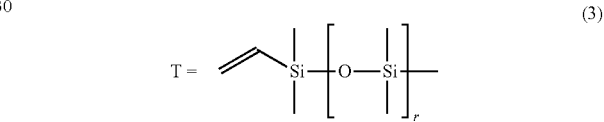

Where n=1-500, m=1-20, o, p and q=0-200, Q1, Q2 and Q3 are H or C1 to C5 alkyl fragments and r=0-10. In a preferred embodiment of the present invention for a linear vinyl terminated alkoxy-SPE copolymer, n=57, m=1, Z is a polyether containing propylene oxide fragments with Q2=CH3 and o=0, p=17, q=0 and T is with r=1.

Linear/Pendant Vinyl SPE

Various vinyl alkoxy-SPE copolymers can also be prepared as the linear/pendant adducts of the terminal group T on reaction products of a diol and an alcohol with a terminal and pendant hydride functionalized dimethylsiloxane using the dehydrogenation process as shown in Scheme 2.

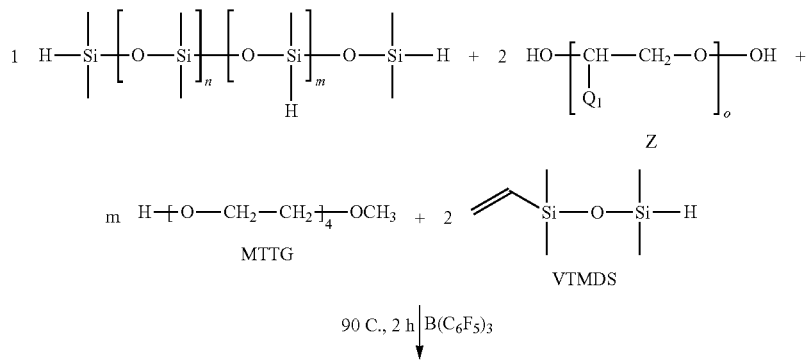

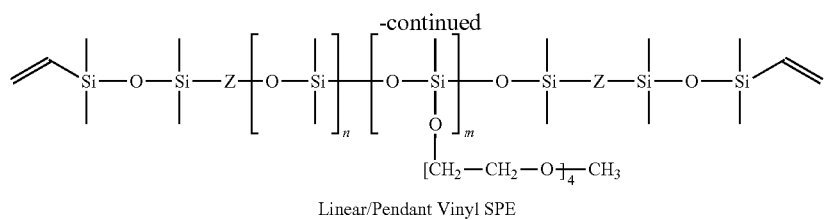

Linear/Pendant Vinyl SPE

Here a 2 step reaction can be used taking advantage of the fact that a terminal substituted hydride is more reactive than a pendant one. So a terminal and pendant substituted HRMS such as a 5/95 HDMS/PDMS oligomer can be reacted first in a 2 step reaction with a 1000 MW polymeric diol (such as P1010 from BASF, Wyandotte Mich.) followed by reaction with methyl tetraglycol (MUG) as a second step to cover the remaining pendant hydro groups. Then as final step, VTMDS is added to endcap and provide vinyl functionality.

Pendant Type Vinyl SPE

Various vinyl alkoxy-SPE copolymers can also be prepared as the pendant adducts of the terminal group T on reaction products of a diol with a pendant hydride functionalized siloxane using the dehydrogenation process as shown here in Formula 4:

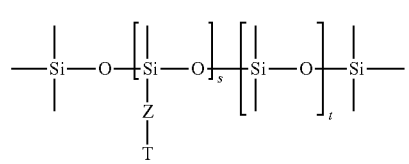
(4)

Where $s=1$-$50$ and $t=1$-$500$. In a preferred embodiment a methylhydrosiloxane-dimethylsiloxane copolymer such as HMS-O71 (Gelest) where $s=2$ and $t=23$ is reacted with a polyether Z containing PO and EO fragments with $Q1=H$ and $Q2=CH3$ and $o+p=55$ and T is with $r=1$. Alternatively, in order to increase the hydrophilicity of the copolymer, it may be advantageous to also prepare a mixed pendant type that includes tethered chains that are of two types, namely purely polyether or polyester and polyether endcapped with the terminating group.

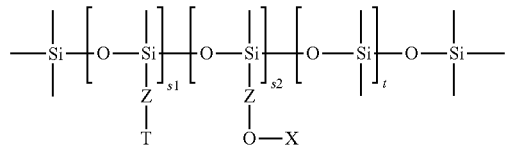

Where $s1+s2=1$-$50$ and $t=1$-$500$ and X is H or an alkyl fragment C1 to C10.

Multi-Substituted Vinyl SPE

In another embodiment, a polyether polyol such as a tetrol is reacted with the endcapper VTMDS to give a multi-vinyl functionalized siloxylated polyether as shown in Formula 5;

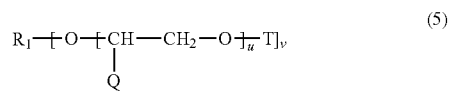
(5)

Where $u=1$-$10$, $v=1$-$10$ and R1 and Q are C1 to C4 alkyl fragments. Use of such compounds is expected to increase crosslinking and effect a speedier hydrosilation reaction when included in an addition silicone formulation. In a preferred embodiment, $s=5$, $t=4$ and $Q=CH3$—

In another embodiment, a polyester polyol such as Desmophen 1880 by Bayer and the like can be used in place of the polyether polyols mentioned in the above examples.

Aside from linear, various other substitutions of the vinyl terminated group can be used, depending on the choice of polyol and hydride functionalized siloxane used in the dehydrogenation reaction. When suitable polyols are used, cyclic structures and star shaped structures can result.

In another embodiment, a linear SPE copolymer is prepared but with using as endcapper a non-functional terminating group such as trimethylsilane, $(CH3)3SiH$ shown in Formula 6.

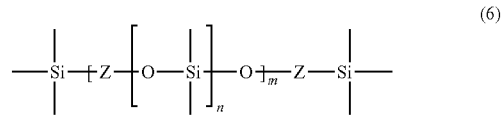
(6)

Then, as a second step, a cyclic vinyl siloxane such as tetravinyloctamethylcyclotetrasiloxane (also named vinyl D4) is added, in an equilibration reaction (using a catalyst such as anhydrous KOH) to modify this SPE copolymer with pendant vinyl groups (Formula 7).

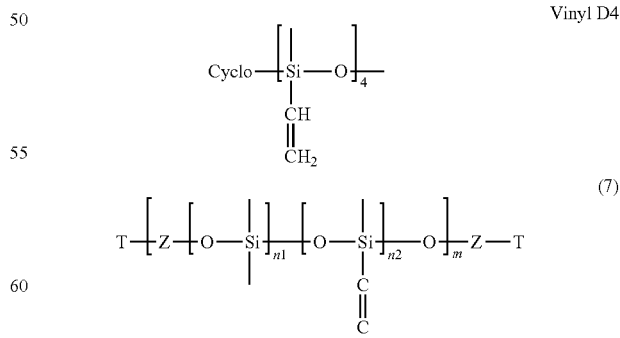

Where $n=1$-$500$, $m=1$-$20$, $n1=1$-$500$ and $n2=1$-$50$

In one embodiment of the present invention, a dental impression material may be formulated where the resin phase may be a mixture of two resin component types. The first resin component type can be the commonly used vinyl polydimethyl siloxane (VPS) polymer. This VPS polymer has a siloxane backbone functionalized with vinyl groups capable of undergoing a hydrosilation reaction, and these vinyl groups may be pendant, terminal or cyclic groups. The second resin component type is a vinyl terminated alkoxy-SPE copolymer prepared using the dehydrogenation reaction as described here, said resin also capable of undergoing hydrosilation. Alternatively, only the vinyl alkoxy-SPE copolymer can be used as the sole component of the resin phase. The impression materials that result from using this resin phase have high flexibility and high hydrophilicity characterized by a low contact angle. To reduce the pot life or working time a small amount of a pendant or cyclic vinyl alkoxy-SPE prepared by dehydrogenation can also be added.

Other uses of the vinyl functionalized alkoxy-SPE copolymer outside of dentistry are also possible. Flexible biomaterials that wet easily and have a low contact angle can be used for hearing aids and maxillofacial repairs. Also, the higher instability of these materials to lower pH also makes them easier to degrade, making them more environmentally friendly biomaterials.

PREPARATION EXAMPLE

The preparation of a linear vinyl terminated alkoxy-SPE is hereby described according to the reaction scheme given:

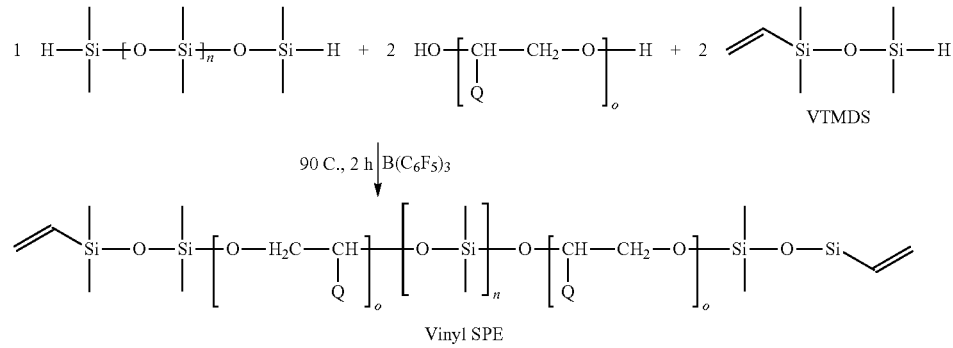

Where n=56, Q is CH3 and o is approx 17.

In a jacketed 5 L reactor using a nitrogen atmosphere 780 g of a propylene glycol (BASF Pluracol P1010, MW 1000) is placed. This is evacuated at 100° C. for 1 hour at below 30 mbar under moderate stirring. Then the temperature is lowered to 90° C. and 1.2 g of the catalyst $B(C6F5)3$ is added under a stream of nitrogen. Using a pressure equalized addition funnel, 1700 g of a hydrogen-terminated polydimethylsiloxane (Gelest, DMS-H21, MW 4250, 100 csk) is added under vigorous stirring at an addition rate of ca. 10 mL/min. Hydrogen gas evolution is observed. After vigorous gas evolution ceases, 128.3 g of Vinyltetramethyldisiloxane is added again dropwise. Stirring is continued for another hour and then the Si—H disappearance is monitored by IR. Upon disappearance of the Si—H stretch (ca. 2170 cm-1) the reaction is stopped.

FORMULATION EXAMPLE

Impression material 2 part pastes of light body viscosity were prepared composed of catalyst and base, mixed at 1:1 ratio. The catalyst paste contains vinyl terminated polydimethylsiloxane 63 parts, crystalline silica 30 parts, a complex of platinum and divinyltetramethyldisiloxane comprising 1% wt platinum 0.3 parts, hydrophilic fumed silica 4 parts. Base paste A contains vinyl terminated polydimethylsiloxane (2,000 cps) 56 parts, hydrogen-terminated polydimethylsiloxane 6 parts, mineral fillers 30 parts, hydrophobic fumed silica 4 parts, and nonionic surfactant nonylphenoxypoly(ethyleneoxy)ethanol (Igepal CO-530, sold by Rhodia Inc. Cranbury N.J.) 4 parts. Base paste B contains vinyl terminated polydimethylsiloxane (2,000 cps) 54 parts, hydrogen-terminated polydimethylsiloxane 6 parts, mineral fillers 30 parts, hydrophobic fumed silica 4 parts, non ionic surfactant nonylphenoxypoly(ethyleneoxy)ethanol (Igepal CO-530, sold by Rhodia Inc. Cranbury N.J.) 2 parts, linear vinyl terminated alkoxy-SPE (from Example 1) 4 parts and pigments <1 part.

The above pastes are tested for contact angle during cure. A goniometer equipped with an injector was used (Model 100, Rame Hart, Netcong N.J.). Thirty seconds after mixing a 5 ul drop of water was applied on the flattened surface and the contact angle was measured after 5 seconds. For the combination of Catalyst and Base paste A, as an average of three tries each, a contact angle of 59.4 (3.0) degrees was observed while for the combination of Base paste B a contact angle of 58.4 (0.6) degrees was observed. Standard deviations are in parentheses. These results show that a slightly lower contact angle is obtained by using the vinyl terminated alkoxy-SPE of this invention with a lower loading of the non-polymerizable surfactant such as Igepal CO-530. It is an advantage to minimize the amount of non-polymerizable nonionic surfactant present since it is potentially extractable in oral fluids and is not incorporated in the cured elastomer. However the vinyl terminated alkoxy-SPE is copolymerizable.

With respect to the method of making the vinyl alkoxy-SPE copolymers of the present invention, a specific method has been disclosed. However, the invention is not so limited. Broadly, in accordance with the present invention, the method of making vinyl functionalized alkoxy-SPE copolymers includes reacting a hydride functionalized siloxane with (a) one or more of an alcohol, a polyether diol, a polyether polyol, a polyester diol or polyester polyol and (b) a hydride functionalized siloxane containing a terminal vinyl group directly bonded to a silicon atom in the presence of a Lewis acid catalyst. Alternatively, to a non-functionalized SPE copolymer prepared with the dehydrogenation process according to the methods of this invention, the vinyl groups bonded to a silicon atom are introduced via an equilibration reaction.

The catalyst may be a Group 3 or 13 (formerly collectively Group III) catalyst. Examples of catalysts are set forth in U.S. Patent Application Publication No. US 2004/0186260, paragraphs 0021-0029 of which are incorporated by reference herein. An exemplary catalyst is tris(pentafluoro-triphenyl)borane, B(C6F5)3.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention is therefore not limited to the specific details, representative apparatus and method and illustrative examples shown and described. Accordingly, departures may be made from such details without departing from the scope of the general inventive concept.

What is claimed is:

1. A method of making a vinyl functionalized alkoxy-siloxylated polyether copolymer, comprising reacting a hydride functionalized siloxane in the presence of a Lewis acid catalyst with (a) one or more of an alcohol, a polyether diol, a polyether polyol, a polyester diol or polyester polyol and (b) a hydride functionalized siloxane containing a terminal vinyl group directly bonded to a silicon atom.

2. The method of claim 1, wherein said vinyl functionalized alkoxy-siloxylated polyether copolymer comprises Structure 1:

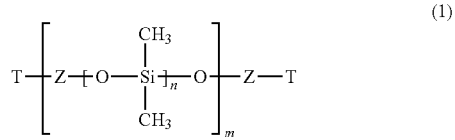

(1)

wherein:
Z is a polyoxyalkylene group composed of ethylene oxide units, propylene oxide units, butylene oxide units or higher alkylene units and combinations thereof as shown in the following formula

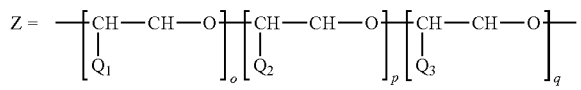

And T is an organic fragment containing a terminal vinyl group directly bonded to a silicon atom as shown in the formula:

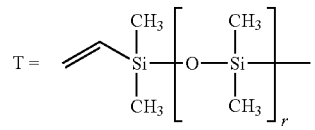

Where n=1-500, m=1-20, o, p and q=0-200, Q1, Q2 and Q3 are H or C1 to C5 alkyl fragments and r=0-10.

3. The method of claim 1, wherein said vinyl functionalized alkoxy-siloxylated polyether copolymer comprises structure 4

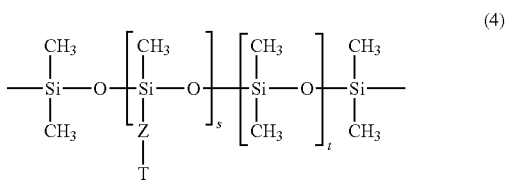

(4)

Where s=1-10 and t=1-500.

4. The method of claim 1, wherein the reaction is carried out in the presence of a tris(pentafluoro-triphenyl)borane catalyst.

* * * * *